Aug. 11, 1959    M. CZAY    2,898,677
CAKE SEPARATOR
Filed June 3, 1957
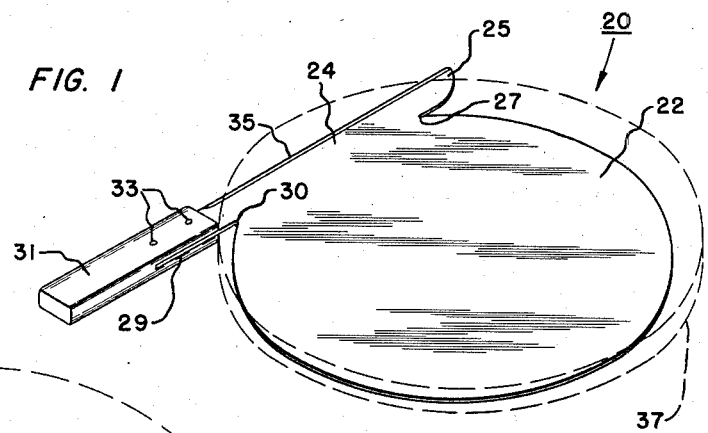
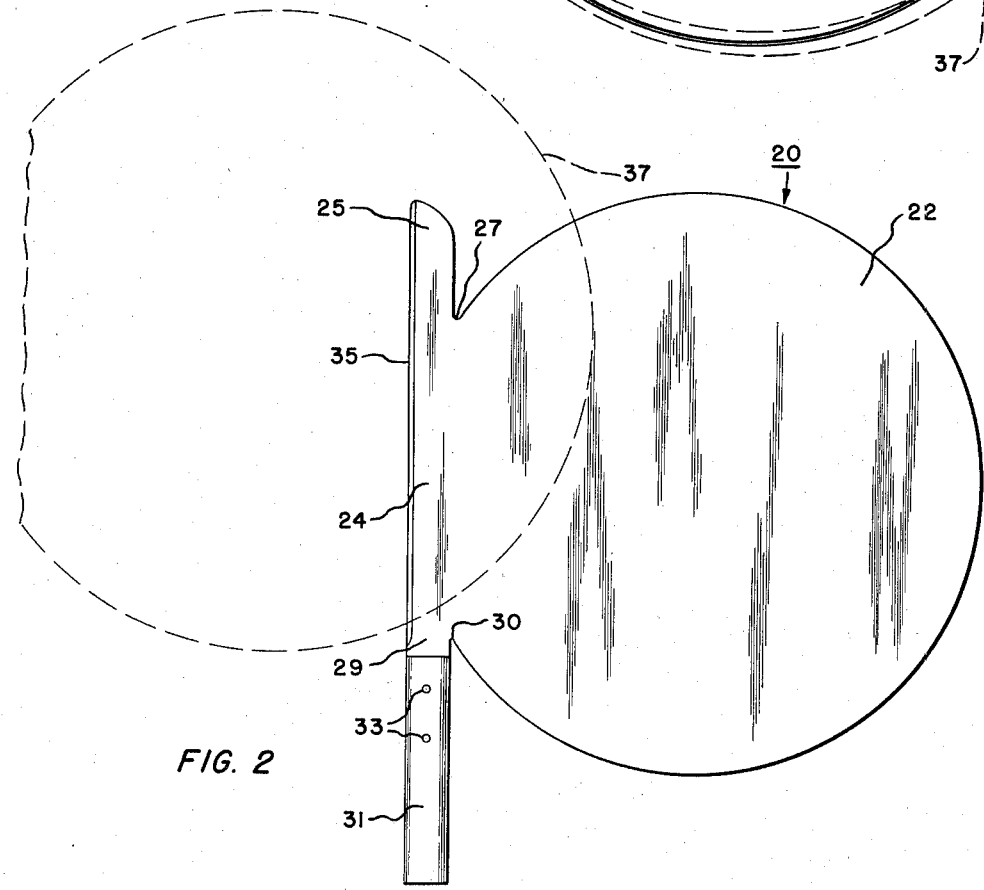
INVENTOR.
MARY CZAY
BY Fulwider, Mattingly
and Huntley ATTORNEYS

United States Patent Office 2,898,677
Patented Aug. 11, 1959

2,898,677
CAKE SEPARATOR
Mary Czay, San Diego, Calif.

Application June 3, 1957, Serial No. 663,080

1 Claim. (Cl. 30—124)

The present invention relates to device for separating a layer of cake into two or more layers.

The device includes a flat, straight edge slicing section and a substantially circularly formed section formed integrally with and lying in the same plane as the slicing section. This circularly shaped section is a sufficient diameter to support the upper layer of cake while it is being sliced and after it has been severed from the layer of cake.

The slicing section includes a portion extending forwardly of the junction of the slicing and circular sections to extend the slicing section of the device, and, has a portion extending rearwardly, forming a support for a handle.

Further objects and advantages will be apparent from the following description, reference being had to the accompanying drawings wherein a preferred embodiment of the invention is illustrated.

In the drawings:

Fig. 1 is a perspective view of the improved device looking downwardly and from the rear of the device; and Fig. 2 is a top plan view of the device.

Referring more in detail to the present invention, the device 20 includes a thin substantially circularly shaped section 22. A slicing section 24 is formed integrally with the section 22. The device, including sections 22 and 24, may be formed of flat metal or any other suitable material which is capable of providing a cutting edge for cake or the like.

Slicing section 24 includes a portion 25 which extends forwardly of the junction 27 of the sections 22 and 24; section 24 also includes a portion 29 which extends rearwardly of the junction 30 of the sections 22 and 24. Portion 29 forms a support for a handle 31 which may be secured to the support 29 by rivets 33.

The outer edge 35 of the slicing section, including the outer edge of portion 25 and the outer edge of portion 29, substantially back to handle 31, is straight and is sharpened for cake severing purpose.

The circular section 22 is preferably approximately nine inches in diameter. By properly manipulating the device a layer of cake, larger in diameter than the diameter of the section 22, can be divided into layers. Section 22, having a nine inch diameter, readily and stably supports a layer of cake of larger diameter while the layer is being severed and after it has been severed from the parent layer. The upper severed layer 37 is shown in phantom by dash lines in both figures.

Thus it is apparent that I have provided a device which is not only capable of severing a layer of cake into two or more layers but also the device provides for stably supporting the upper of the severed layer.

While the form of embodiment herein shown and described constitutes a preferred form, it is to be understood that other forms may be adopted falling within the scope of the claim that follows.

I claim:

A device for separating a layer of cake into two or more layers, said device comprising a flat substantially circularly shaped cake supporting section and an elongated flat slicing section lying in the same plane as said cake supporting section, the diameter of said cake supporting section being at least equal to the longitudinal length of said slicing section, said flat slicing section being integrally joined at one edge to said cake supporting section to form a planar continuation of said cake supporting section, the opposite edge of said flat slicing section located remote from said cake supporting section being formed into a sharp cutting edge, said flat slicing section having an end portion extending forwardly and an end portion extending rearwardly of the points of junction of said flat slicing section with said cake supporting section, said rearwardly extending end portion forming a support for a handle.

References Cited in the file of this patent

UNITED STATES PATENTS

| 8,817 | Frary | Nov. 30, 1875 |
| 2,612,687 | Burch | Oct. 7, 1952 |

FOREIGN PATENTS

| 238,406 | Great Britain | Aug. 20, 1925 |
| 627,832 | France | June 20, 1937 |